US012500954B2

(12) United States Patent
Inoue et al.

(10) Patent No.: US 12,500,954 B2
(45) Date of Patent: Dec. 16, 2025

(54) CREW SUPPORT SYSTEM, AND SERVER, COMMUNICATION TERMINAL, AND CLIENT TERMINAL FOR THE CREW SUPPORT SYSTEM

(71) Applicant: YAMAHA HATSUDOKI KABUSHIKI KAISHA, Iwata (JP)

(72) Inventors: Ryota Inoue, Shizuoka (JP); Toshihiko Ono, Shizuoka (JP); Akira Takeuchi, Shizuoka (JP); Yasuhiro Kitazawa, Shizuoka (JP); Haruhiko Hashimoto, Shizuoka (JP); Yoshimasa Kinoshita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/515,866

(22) Filed: Nov. 21, 2023

(65) Prior Publication Data
US 2024/0179214 A1 May 30, 2024

(30) Foreign Application Priority Data
Nov. 25, 2022 (JP) .................................. 2022-188463

(51) Int. Cl.
*H04L 67/12* (2022.01)
(52) U.S. Cl.
CPC .................................... *H04L 67/12* (2013.01)
(58) Field of Classification Search
CPC ....... H04L 67/12; H04L 5/0082; H04L 67/62; H04L 41/0681; H04L 2012/40267; H04L 12/4013; H04L 43/062; G07C 5/0808; G07C 5/008; G07C 5/00
See application file for complete search history.

(56) References Cited

U.S. PATENT DOCUMENTS

| | | | |
|---|---|---|---|
| 6,763,226 B1 * | 7/2004 | McZeal, Jr. ............. | H04L 51/58 455/575.1 |
| 10,162,693 B1 * | 12/2018 | Contino .............. | G06F 11/0742 |
| 2004/0139052 A1 * | 7/2004 | Kazushige ................ | H04L 9/40 |

(Continued)

FOREIGN PATENT DOCUMENTS

JP 2021-108014 A 7/2021

*Primary Examiner* — Schquita D Goodwin
*Assistant Examiner* — Linh T. Nguyen
(74) *Attorney, Agent, or Firm* — Keating & Bennett, LLP

(57) ABSTRACT

A crew support system includes a communication terminal to collect information about a device on a watercraft and transmit the information, a server to receive the information from the communication terminal, and a client terminal to communicate with the server. The communication terminal includes a periodic transmission mode to transmit the information to the server in a periodic transmission cycle, and a high-speed transmission mode to transmit the information in a cycle shorter than the periodic transmission cycle. The server determines a status of the watercraft, and transmits information about measures to address the status, to the client terminal, based on the result of the determination. The client terminal provides the information received from the server to a user. The server determines whether or not a recovery operation by the crew is possible, and transmits information about the result of the determination regarding the recovery operation to the client terminal.

11 Claims, 9 Drawing Sheets

(56) References Cited

U.S. PATENT DOCUMENTS

| | | | | |
|---|---|---|---|---|
| 2004/0223468 | A1* | 11/2004 | Benco | H04L 12/1485 |
| | | | | 455/450 |
| 2006/0101116 | A1* | 5/2006 | Rittman | H04L 12/1813 |
| | | | | 709/204 |
| 2010/0005365 | A1* | 1/2010 | Buchmann | H03M 13/13 |
| | | | | 714/758 |
| 2014/0324279 | A1* | 10/2014 | Shinohara | G05B 23/0216 |
| | | | | 701/31.5 |
| 2017/0180963 | A1* | 6/2017 | Cavendish | H04W 52/0229 |
| 2020/0136979 | A1* | 4/2020 | Honda | H04L 67/12 |
| 2020/0172028 | A1* | 6/2020 | Kawauchi | H04L 25/0276 |
| 2022/0123891 | A1* | 4/2022 | Ji | H04B 17/104 |
| 2022/0242425 | A1* | 8/2022 | Sun | G07C 5/0808 |
| 2022/0392272 | A1* | 12/2022 | Huang | B60R 16/0232 |
| 2023/0362613 | A1* | 11/2023 | Shin | H04W 4/40 |

\* cited by examiner

FIG. 3

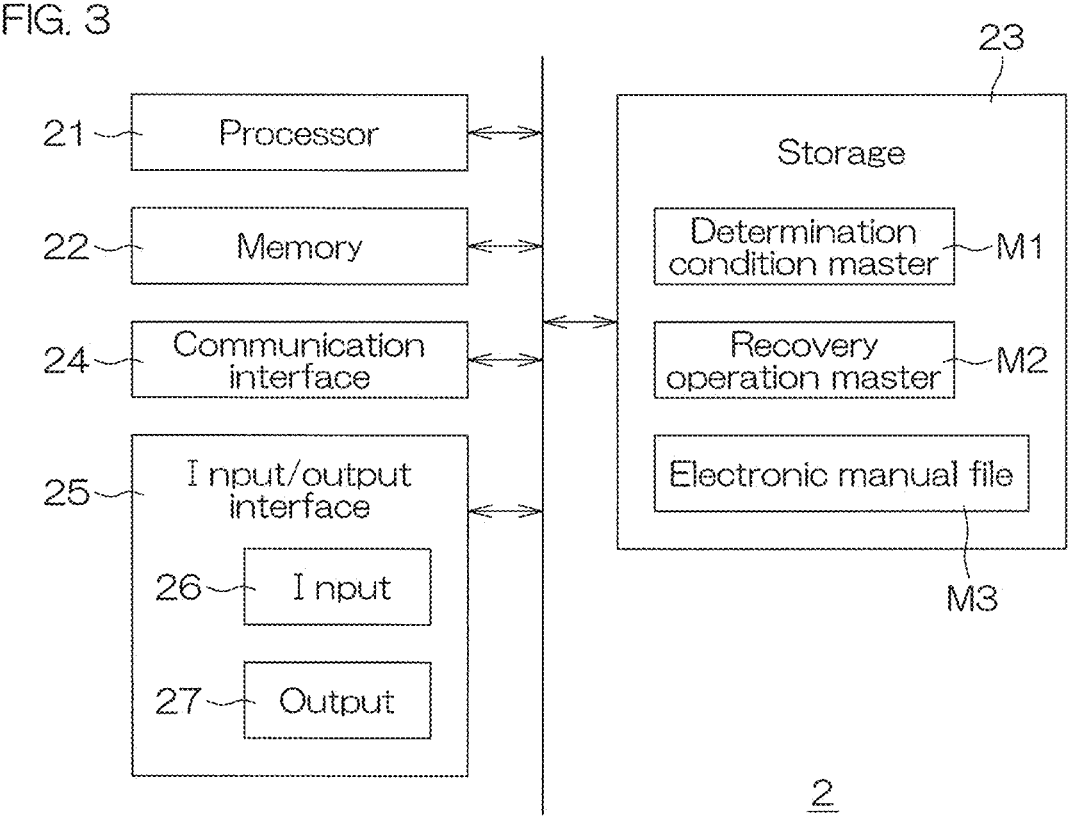

FIG. 4

| Determination condition master | M1 | |
|---|---|---|
| Precondition | Sensor | Threshold for abnormality |
| Positive idling determination | Rotation speed | 800> |
| Positive idling determination | Intake pressure | 30> |
| Positive idling determination | Main switch | <1 |
| Positive stop determination | Kill switch | >0 |
| Startup impossible symptom is inputted | Shift position | >0 |
| Startup impossible symptom is inputted | Battery voltage | <9V |

CREW SUPPORT SYSTEM, AND SERVER, COMMUNICATION TERMINAL, AND CLIENT TERMINAL FOR THE CREW SUPPORT SYSTEM

CROSS REFERENCE TO RELATED APPLICATIONS

This application claims the benefit of priority to Japanese Patent Application No. 2022-188463 filed on Nov. 25, 2022. The entire contents of this application are hereby incorporated herein by reference.

BACKGROUND OF THE INVENTION

1. Field of the Invention

The present invention relates to a crew support system, and to a server, communication terminal, and client terminal for the crew support system.

2. Description of the Related Art

The captains of boats are chief persons in charge of boat schedule management and safety management, and are responsible for inspection of the hulls, the propulsion devices and other devices of the boats, and for various preparative operations before boat departure. The captains are also responsible for coping with problems during sailing.

However, not all captains of small boats such as pleasure boats are necessarily skillful. On such a small boat, an engineering crew having technical expertise is less likely to be present together with the captain, unlike on a large boat. Therefore, it is often difficult to resolve a trouble or problem occurring in the boat during sailing. Basic measures to take to address the problem are, for example, to find the cause of the problem in accordance with a manual provided in the boat, and to properly eliminate the cause. Where it is difficult to find the cause of the problem or to eliminate the cause, rescue is requested by phone or other wireless communication. Typically, the rescue request is sent to marina staff or boat dealer staff. If self-sailing of the boat is impossible due to a problem occurring in a propulsion device, for example, rescue staff is dispatched to the boat to perform a rescue operation (e.g., to perform a necessary repair operation or to tow the boat).

JP 2021-108014A (see FIG. 10 in JP 2021-108014A) discloses a fleet management support system that functions for risk management of the hulls of boats of a fleet. Specifically, the boats of the fleet each include a sensing device and a communication terminal, and a sensing result acquired by the sensing device is transmitted from the communication terminal to a server at a predetermined time interval (e.g., at an interval of one minute) and accumulated in the server. The server compares the sensing result with a threshold for abnormality determination. If an abnormality occurs in any of the boats of the fleet, the server transmits an abnormality detection result to all the boats of the fleet.

SUMMARY OF THE INVENTION

The inventor of preferred embodiments of the present invention described and claimed in the present application conducted an extensive study and research regarding a crew support system, such as the one described above, and in doing so, discovered and first recognized new unique challenges and previously unrecognized possibilities for improvements as described in greater detail below.

In the conventional art disclosed in JP 2021-108014A, the boats of the fleet are each informed of an abnormal condition detected by the sensing device, and the crew of the boat of interest and the crews of the other boats of the fleet are expected to resolve the abnormal condition. However, it is not necessarily easy to find the cause of the abnormal condition. Therefore, the boat of interest is not repaired at the spot, but is generally sailed back to port and then repaired. Further, it is not necessarily easy to find the cause of the abnormal condition based only on information about specific sensing results periodically transmitted to the server at a time interval of about one minute. Therefore, it is difficult to provide information from the server about the cause of the abnormal condition and/or measures to take to address the abnormal condition.

Preferred embodiments of the present invention provide crew support systems that are each able to monitor and determine a status of a boat in real time, and provide information about proper measures to take in a short period of time.

Other preferred embodiments of the present invention provide servers, communication terminals, and client terminals for the crew support systems described above.

In order to overcome the previously unrecognized and unsolved challenges described above, a preferred embodiment of the present invention provides a crew support system including a communication terminal configured or programmed to collect information about a device provided on a watercraft and transmit the information, a server configured or programmed to receive the information from the communication terminal and accumulate the information therein, and a client terminal configured or programmed to communicate with the server to receive the information from the server. The communication terminal includes a periodic transmission mode in which the information is transmitted to the server in a periodic transmission cycle, and a high-speed transmission mode in which the information is transmitted to the server in a cycle shorter than the periodic transmission cycle. The server is configured or programmed to determine the status of the watercraft based on the information received from the communication terminal, and transmit information about measures to address a problem with the status of the watercraft (more specifically, necessary or possible measures) to the client terminal based on the result of the determination. The client terminal provides the information received from the server to a user. The user to which the information is provided is typically a general user, manufacturer staff, dealer staff, or marina staff.

With this arrangement, the communication terminal collects the information about the device provided on the watercraft and transmits the information to the server, and the server receives the information and accumulates the information therein. The communication terminal includes the high-speed transmission mode in which the information is transmitted to the server in the shorter cycle, in addition to the periodic transmission mode in which the information is transmitted to the server in the periodic transmission cycle. In the high-speed transmission mode, therefore, the communication terminal can transmit a greater amount of information to the server in a shorter period of time. The server can collect the greater amount of information from the communication terminal in the high-speed transmission mode in a shorter period of time and, therefore, can monitor and properly determine the status of the watercraft substantially in real time. Thus, the server can transmit the information about the proper (possible) measures to take to address the problem with the status, to the client terminal based on the proper determination. The user can properly resolve the problem with the status of the watercraft in a shorter period of time by receiving the information about the measures to take.

Where a problem occurs in, on or with the watercraft, for example, the communication terminal is operated in the high-speed transmission mode such that the server can collect a greater amount of information in a shorter period of time to provide a proper resolution procedure in a shorter period of time. If the resolution procedure is an onboard resolution procedure, an onboard crew can resolve the problem according to the onboard resolution procedure by herself/himself. Even if the crew has a lower level of skill, the crew can access the proper resolution procedure in a shorter period of time and, therefore, can speedily recover from the problem. In this case, there is no need to dispatch rescue staff from a marina, dealer or the like. This alleviates a burden on the rescue staff.

When the watercraft is in a normal state, on the other hand, the communication terminal can be operated in the power-saving periodic transmission mode, so that the onboard power consumption can be reduced or minimized. Therefore, both the power saving and the high-speed data transmission as required can be achieved.

In a preferred embodiment of the present invention, the server is configured or programmed to determine, based on the result of the determination on the status of the watercraft, whether or not a recovery operation by the crew is possible, and transmit information about the result of the determination on the recovery operation to the client terminal. With this arrangement, the information about the result of the determination on whether or not the recovery operation by the crew is possible is provided to the client terminal by the server. Therefore, the crew can speedily find whether or not the crew can resolve the problem with the status of the watercraft. If the recovery operation by the crew is impossible, a rescue activity can be speedily started.

In a preferred embodiment of the present invention, the server is configured or programmed to determine the status of the watercraft based on a combination of a plurality of information items received from the communication terminal (more specifically, a relationship among a plurality of information items). With this arrangement, the determination can be speedily carried out based on the combination of the plurality of information items so that the crew can be properly supported.

In a preferred embodiment of the present invention, the communication terminal is configured or programmed to be switched from the periodic transmission mode to the high-speed transmission mode in response to a command from the server. With this arrangement, when the server needs a greater amount of information, the information can be transmitted at a higher rate by efficiently utilizing the high-speed transmission mode. In other cases, the communication terminal can be operated in the power-saving periodic transmission mode.

In a preferred embodiment of the present invention, the communication terminal is switched from the periodic transmission mode to the high-speed transmission mode in response to a command applied from a command device provided on the watercraft. With this arrangement, the crew can efficiently utilize the high-speed transmission mode to transmit the information at a higher rate by applying the command from the command device as required. In other cases, the communication terminal can be operated in the power-saving periodic transmission mode.

In a preferred embodiment of the present invention, the server includes a web application program to be operated via the web browser of the client terminal, and is configured or programmed to accept an input from the client terminal and provide the information to the client terminal by the web application program.

In a preferred embodiment of the present invention, the client terminal includes an application program accessible to the server, and is configured or programmed to transmit and receive information to/from the server by the function of the application program.

Two or more of the features described above may be used in combination.

Another preferred embodiment of the present invention provides a server for use in the crew support system including any of the features described above.

Another further preferred embodiment of the present invention provides a communication terminal for use in the crew support system including any of the features described above.

Still another preferred embodiment of the present invention provides a client terminal for use in the crew support system including any of the features described above.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a block diagram showing a configuration of a server by way of example.

FIG. 4 shows a determination condition master provided in the server by way of example.

DETAILED DESCRIPTION OF THE PREFERRED EMBODIMENTS

Figure 1:
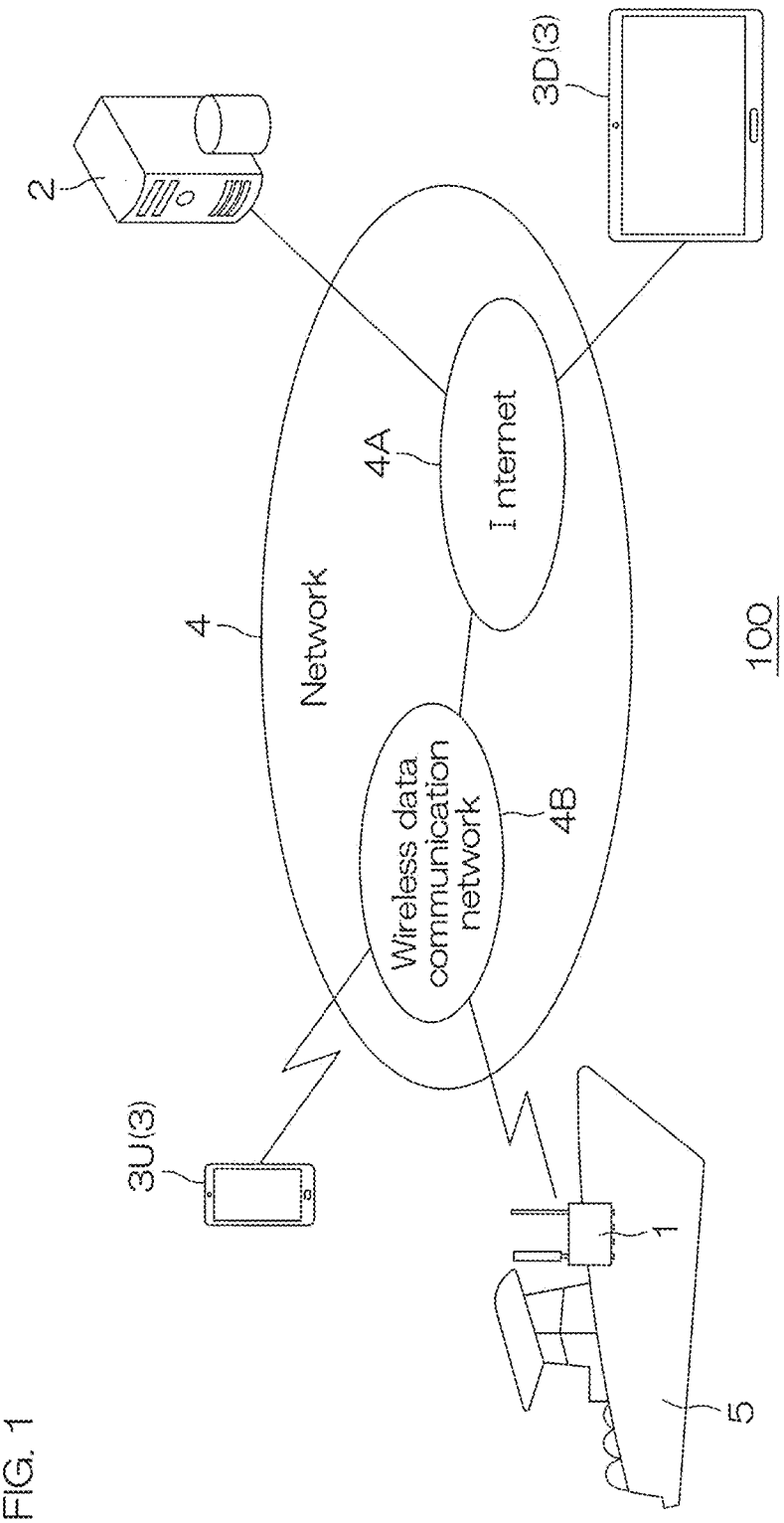
FIG. 1 is a schematic diagram of a crew support system according to a preferred embodiment of the present invention.

FIG. 1 is a schematic diagram of a crew support system according to a preferred embodiment of the present invention. The crew support system 100 includes a communication terminal 1 that collects and transmits information about devices provided in or on a watercraft 5, a server 2 that receives and accumulates the information transmitted from the communication terminal 1, and a client terminal 3 that communicates with the server 2. The communication terminal 1 may be provided in or on the watercraft 5. Further, the communication terminal 1 may be portable so that a crew member can bring the communication terminal 1 into or onto the watercraft 5 as required.

The communication terminal 1 and the server 2 can communicate with each other via a network 4. That is, the communication terminal 1 and the server 2 are each connected to the network 4 in a communicable manner. The network 4 typically includes an internet 4A. The communication terminal 1 is connected to a wireless data communication network 4B such as a mobile phone network in a communicable manner, and is connected to the internet 4A via the wireless data communication network 4B in a communicable manner.

The client terminal 3 may be provided in a dealer office and/or a marina office (hereinafter referred to as "dealer client terminal 3D"). The client terminal 3 may be a mobile terminal such as a smartphone carried by a user (hereinafter referred to as "user client terminal 3U").

The dealer client terminal 3D may be configured to be connectable to the internet 4A via a local area network (not shown) provided in the office, or may be configured to be connectable to the internet 4A via the wireless data communication network 4B. The user client terminal 3U is typically configured to be connectable to the internet 4A via the wireless data communication network 4B. Further, the user client terminal 3U may be connected to the communication terminal 1 in a data communicable manner. In this case, the user client terminal 3U may be connectable to the network 4 via the communication terminal 1.

Figure 2:
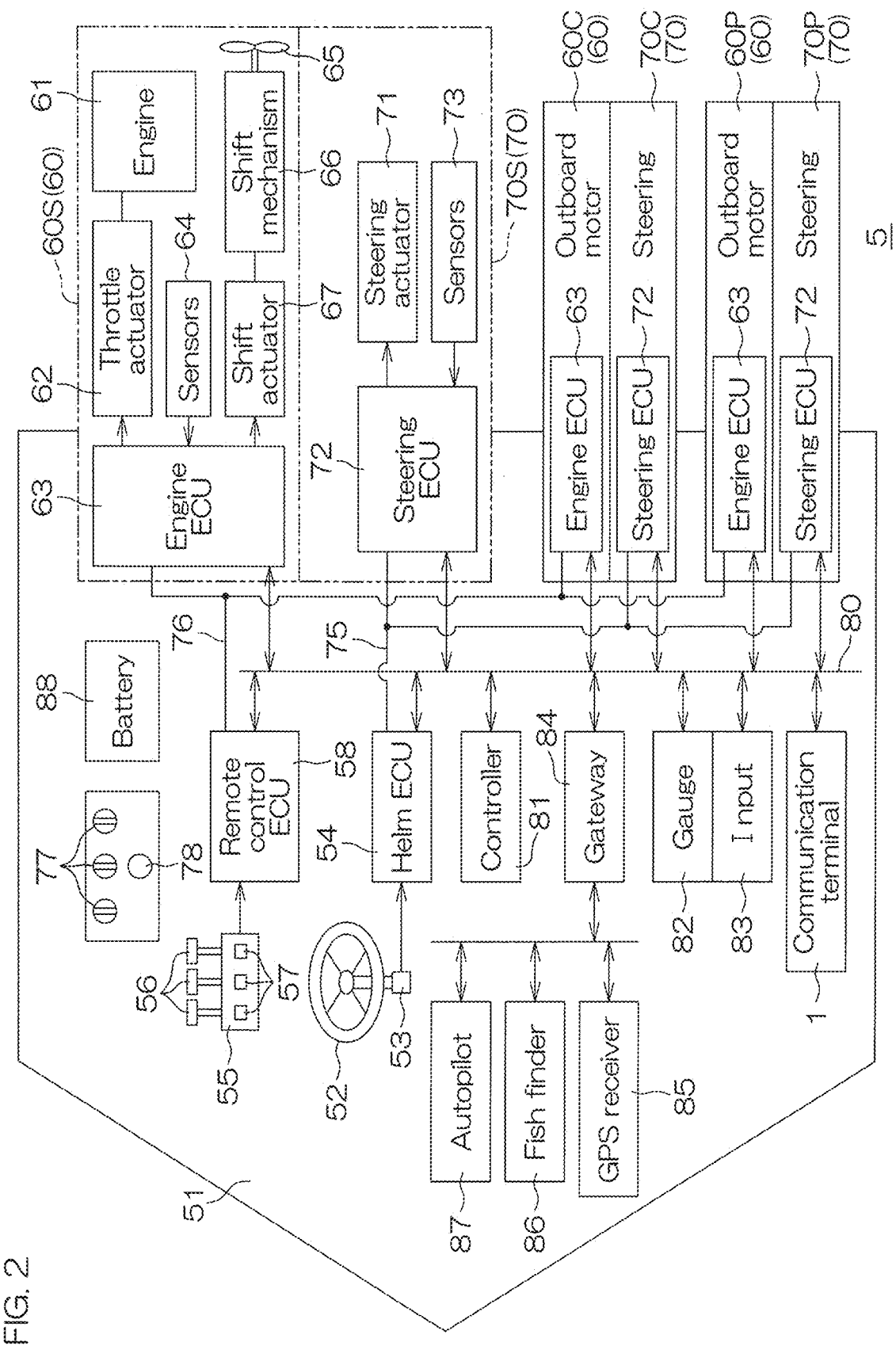
FIG. 2 is a block diagram showing a configuration of a watercraft by way of example.

FIG. 2 is a block diagram showing the configuration of the watercraft 5 by way of example. The watercraft 5 includes a hull 51, and various devices provided on the hull 51 (watercraft devices or rigging devices). The watercraft devices typically include an input device to maneuver the watercraft (watercraft maneuvering devices), a controller 81 that comprehensively controls the devices provided on the watercraft 5, a propulsion device that applies a propulsive force to the hull 51, and a steering device that changes the advancing direction of the hull 51.

In a preferred embodiment of the present invention, the input device includes a steering wheel 52 and a remote controller 55.

In a preferred embodiment of the present invention, the propulsion device includes an outboard motor 60. Specifically, the outboard motor 60 includes one or more outboard motors 60 provided on the stern of the hull 51. In this example, a plurality of outboard motors 60 (more specifically, three outboard motors 60) are disposed side by side and attached to the stern. In this example, the outboard motors 60 are engine outboard motors each including an engine 61 (internal combustion engine) as a power source to drive a propeller 65. Of course, electric outboard motors each including an electric motor as a power source may be used instead. For discrimination among these three outboard motors 60, a middle one of the outboard motors 60 is referred to as "middle outboard motor 60C" and the other two outboard motors 60 located on the left side and the right side of the middle outboard motor 60C are respectively referred to as "port-side outboard motor 60P" and "starboard-side outboard motor 60S."

In a preferred embodiment of the present invention, the steering device includes steering devices 70 that respectively steer the outboard motors 60 leftward and rightward. The steering devices 70 are provided in one-to-one correspondence with the outboard motors 60. In this example, three steering devices 70 are provided. For discrimination among the three steering devices 70 respectively corresponding to the middle outboard motor 60C, the port-side outboard motor 60P and the starboard-side outboard motor 60S, these steering devices 70 are referred to as "middle steering device 70C," "port-side steering device 70P" and "starboard-side steering device 70S."

The steering wheel 52 is turned by a watercraft operator. The operation angle of the steering wheel 52 is detected by an operation angle sensor 53, and inputted to a helm ECU (Electronic Control Unit) 54. The remote controller 55 includes acceleration levers 56 to be operated by the watercraft operator to adjust the directions (forward or reverse directions) and the magnitudes of propulsive forces to be generated by the respective outboard motors 60. The operation positions of the acceleration levers 56 are respectively detected by acceleration position sensors 57, and inputted to a remote control ECU 58.

The outboard motors 60 each include the engine 61, the propeller 65 that is driven by the engine 61, a shift mechanism 66, and an engine ECU 63. The shift mechanism 66 has a plurality of shift positions, i.e., a forward shift position, a reverse shift position, and a neutral shift position. With the shift position set to the forward shift position, the propeller 65 is rotated in a forward rotation direction by the driving force of the engine 61. With the shift position set to the reverse shift position, the propeller 65 is rotated in a reverse rotation direction by the driving force of the engine 61. With the shift position set to the neutral shift position, power transmission between the engine 61 and the propeller 65 is cut off. The engine ECU 63 controls the operation of a shift actuator 67 that actuates the shift mechanism 66 to control the direction of the propulsive force. Further, the engine ECU 63 controls the operation of a throttle actuator 62 that drives the throttle valve of the engine 61 to control the magnitude of the propulsive force.

The steering devices 70 each include a steering actuator 71 and a steering ECU 72 that controls the steering actuator 71. The steering actuator 71 generates power to pivot the corresponding outboard motor 60 leftward and rightward about its steering shaft (not shown). Thus, the direction of the propulsive force applied to the hull 51 by the outboard motor 60 is changed leftward and rightward such that the advancing direction of the watercraft 5 is changed. The steering device 70 may be unitary with the corresponding outboard motor 60, or may be separate from the outboard motor 60. In FIG. 2, the steering device 70 and the outboard motor 60 are configured as a unitary unit by way of example.

The helm ECU 54 is connected to the steering ECUs 72 via a steering command line 75. As shown, the steering command line 75 may directly connect the helm ECU 54 to all the steering devices 70. Further, the steering command line 75 may directly connect the helm ECU 54 to the steering ECU 72 of the port-side steering device 70P and/or the steering ECU 72 of the starboard-side steering device 70S, but the steering ECU 72 of the middle steering device 70C does not need to be directly connected to the helm ECU 54. That is, the steering command line 75 may be configured so that the steering ECU 72 of the middle steering device 70C is connected to the helm ECU 54 indirectly via the steering ECU 72 of the port-side steering device 70P and/or the steering ECU 72 of the starboard-side steering device 70S. The steering command line 75 transmits a steering command signal generated by the helm ECU 54. The steering command signal is applied to command the steering directions and the steering angles of the outboard motors 60 as corresponding to the operation direction (turning direction) and the operation angle of the steering wheel 52.

The remote control ECU 58 is connected to the engine ECUs 63 via an output command line 76. In a preferred embodiment of the present invention, the output command line 76 directly connects the remote control ECU 58 to the engine ECUs 63 of all the outboard motors 60. Alternatively, like the steering command line 75, the output command line 76 may connect the engine ECU 63 of the middle outboard motor 60C to the remote control ECU 58 via the engine ECU 63 of the port-side outboard motor 60P and/or the engine ECU 63 of the starboard-side outboard motor 60S. The output command line 76 transmits an output command generated by the remote control ECU 58. The output command is applied to command the directions and the magnitudes of the propulsive forces of the respective outboard motors 60.

A data communication network, i.e., an onboard LAN (Local Area Network) 80, is provided in or on the watercraft. The controller 81 is connected to the onboard LAN 80. Further, the helm ECU 54, the remote control ECU 58, the steering ECUs 72, and the engine ECUs 63 are each connected to the onboard LAN 80.

The controller 81 can acquire information about the steering command from the helm ECU 54, and can acquire information about the output command from the remote control ECU 58.

The controller 81 can acquire various information from the steering ECU 72 of each of the steering devices 70. For example, the controller 81 can acquire the information about the steering command received by the steering ECU 72, and information about detection results obtained by various sensors 73 provided in the steering device 70. The sensors 73 include, for example, a steering angle sensor. The steering angle sensor detects the actual steering angle of the outboard motor 60. The steering angle sensor may be configured to detect the operation amount of the steering actuator 71.

Further, the controller 81 can acquire various information from the engine ECU 63 of each of the outboard motors 60. For example, the controller 81 can acquire the information about the output command received by the engine ECU 63, and information about detection results obtained by various sensors 64 provided in the outboard motor 60. The sensors 64 include, for example, a throttle opening degree sensor, an engine rotation speed sensor, and an engine temperature sensor. The throttle opening degree sensor is able to detect the opening degree of the throttle valve of the engine 61. The engine rotation speed sensor is able to detect the rotation speed of the engine 61, and may be a crank angle sensor. The engine ECU 63 may be able to process the output of the crank angle sensor to generate engine rotation speed information. The engine temperature sensor may be able to detect the temperature of the cylinder block of the engine 61 (e.g., the temperature of cooling water), or may be able to detect the exhaust temperature of the engine 61.

A gauge 82 that displays various information is connected to the onboard LAN 80. Further, the communication terminal 1 is connected to the onboard LAN 80. The communication terminal 1 is able to transmit the information about the status of the watercraft 5 and the like to the server 2 (see FIG. 1).

The gauge 82 functions, for example, as a display device to display a residual fuel amount, the engine rotation speeds and the shift positions of the respective outboard motors 60, a residual battery capacity, and the like. The residual battery capacity is the residual capacity of a battery 88 mounted on the hull 51 to actuate starter motors (not shown) incorporated in the respective outboard motors 60 to start the engine. The battery 88 discharges to start the engine, and is charged by power generators (not shown) incorporated in the respective outboard motors 60 during the operation of the engines. The gauge 82 may include an input device 83 such as input buttons and a touch panel. The input device 83 may be operated by the user to input various commands. The input device 83 may be provided separately from the gauge 82.

Additionally, various watercraft devices may be connected to the onboard LAN 80 in a data communicable manner. A third party's watercraft devices (e.g., aftermarket devices) are typically connected to the onboard LAN 80 via a gateway 84. In FIG. 2, a GPS (Global Positioning System) receiver 85, a fish finder 86, and an autopilot device 87 are illustrated as examples of the third party's watercraft devices.

The steering wheel 52 and the remote controller 55 are disposed in association with a helm seat, and a main switch 77 to be operated to turn on and off power supply to the outboard motors 60 and to start and stop the engines 61 of the outboard motors 60 is also disposed in association with the helm seat. A kill switch 78 (emergency stop switch) to be operated to nullify the propulsive forces of the outboard motors 60 (typically to stop the engines 61) in an emergency is provided in association with the helm seat. The kill switch 78 includes, for example, an operation end to which a lanyard cable carried by the watercraft operator is connected. When the watercraft operator falls overboard, the kill switch 78 is actuated for the emergency stop of the engines 61 of the outboard motors 60.

FIG. 3 is a block diagram showing the configuration of the server 2 by way of example. The server 2 has a basic configuration as a computer. That is, the server 2 includes a processor 21, a memory 22, a storage 23, a communication interface 24, and an input/output interface 25, which are connected to each other in a data communicable manner in the server 2.

The processor 21 executes a program stored in the memory 22 to perform various functions. Specifically, the server 2 includes the function of communicating with the communication terminal 1 (see FIG. 1), collecting data from the communication terminal 1, and storing the data in the storage 23. Further, the server 2 includes the function of communicating with the dealer client terminal 3D (see FIG. 1), providing a web page to the dealer client terminal 3D, and providing a web application service on the web page. In order to provide the web application service, a web application program is stored in the memory 22. Further, the server 2 includes the function of communicating with the user client terminal 3U (see FIG. 1), and providing information to an application provided in the user client terminal 3U. The storage 23 provides a storage area for the accumulation of the data. The communication interface 24 interfaces with the network 4 for communications. The input/output interface 25 includes an input device 26 (e.g., a keyboard) and an output device 27 (e.g., a display device) to provide a man-machine interface.

A determination condition master M1, a recovery operation master M2, an electronic manual file M3 and the like are stored in the storage 23.

FIG. 4 shows an example of the determination condition master M1. The determination condition master M1 is a database defined by a table including a plurality of determination condition records. The determination condition records each include a precondition field, a sensor field, and an abnormality threshold field. In the precondition field, a precondition for a determination condition is described. In the sensor field, a sensor type for the determination condition is described. In the abnormality threshold field, a threshold to be compared with the detection value of the sensor is described.

In FIG. 4, "Positive idling determination" described in the precondition field by way of example indicates that an idling determination is positive. The idling determination is to determine whether or not the engines 61 of the outboard motors 60 are in an idling state. If the idling determination is positive, the engines 61 of the outboard motors 60 are in the idling state. "Positive stop determination" indicates that a stop determination is positive. The stop determination is to determine whether or not the engines 61 of the outboard motors 60 are in a stop state. If the stop determination is positive, the engines 61 of the outboard motors 60 are in the stop state. These determination results are acquired by the communications with the communication terminal 1. "Startup impossible condition is inputted" indicates that a problem condition such that the startup of the engines 61 of the outboard motors 60 is impossible is inputted. This is typically inputted by the dealer staff, the marina staff, the user or the like by operating the client terminal 3. The server 2 acquires the input result by communications with the client terminal 3.

"Rotation speed" described in the sensor field in FIG. 4 by way of example indicates the engine rotation speed sensors. An abnormality threshold for the rotation speeds is, for example, 800 rpm. That is, a determination condition record on the first line in the table defines an abnormality determination condition such that any of the detection values of the engine rotation speed sensors are less than 800 rpm when the idling determination is positive. Similarly, "Intake pressure" indicates intake pressure sensors that detect the intake pressures of the engines 61. An abnormality threshold for the intake pressures is, for example, 30 kPa. That is, a determination condition record on the second line in the table defines an abnormality determination condition such that any of the detection values of the intake pressure sensors are less than 30 kPa when the idling determination is positive. "Main switch" indicates the main switch 77 (see FIG. 2). The ON state of the main switch 77 is represented by a value of 1, and the OFF state of the main switch 77 is represented by a value of 0. A determination condition record on the third line in the table defines an abnormality determination condition such that the value of the main switch 77 is less than 1 (i.e., 0) when the idling determination is positive. "Kill switch" indicates the kill switch 78 (see FIG. 2). As described above, the kill switch 78 is connected to the watercraft operator, for example, via the lanyard cable. If the watercraft operator falls overboard, the kill switch 78 is operated to be turned on, and the engines 61 are forcibly stopped. The ON state of the kill switch 78 is represented by 1, and the OFF state of the kill switch 78 is represented by 0. A determination condition record on the fourth line in the table defines an abnormality determination condition such that the value of the kill switch is greater than 0 (i.e., 1) when the stop determination is positive. "Shift position" indicates shift position sensors. A neutral shift position detection state is represented by 0, and a forward shift position detection state and a reverse shift position detection state (shift-in state) are each represented by 1. A determination condition record on the fifth line in the table defines an abnormality determination condition such that any of the shift position sensors have a value of greater than 0 (i.e., the shift-in state) when the startup impossible condition is inputted. "Battery voltage" indicates the voltage of the battery 88 for the engine start. An abnormality threshold for the voltage of the battery 88 is 9 V, for example. That is, a determination condition on the sixth line in the table defines an abnormality determination condition such that the voltage of the battery 88 is less than 9 V when the startup impossible condition is inputted.

Figure 5:
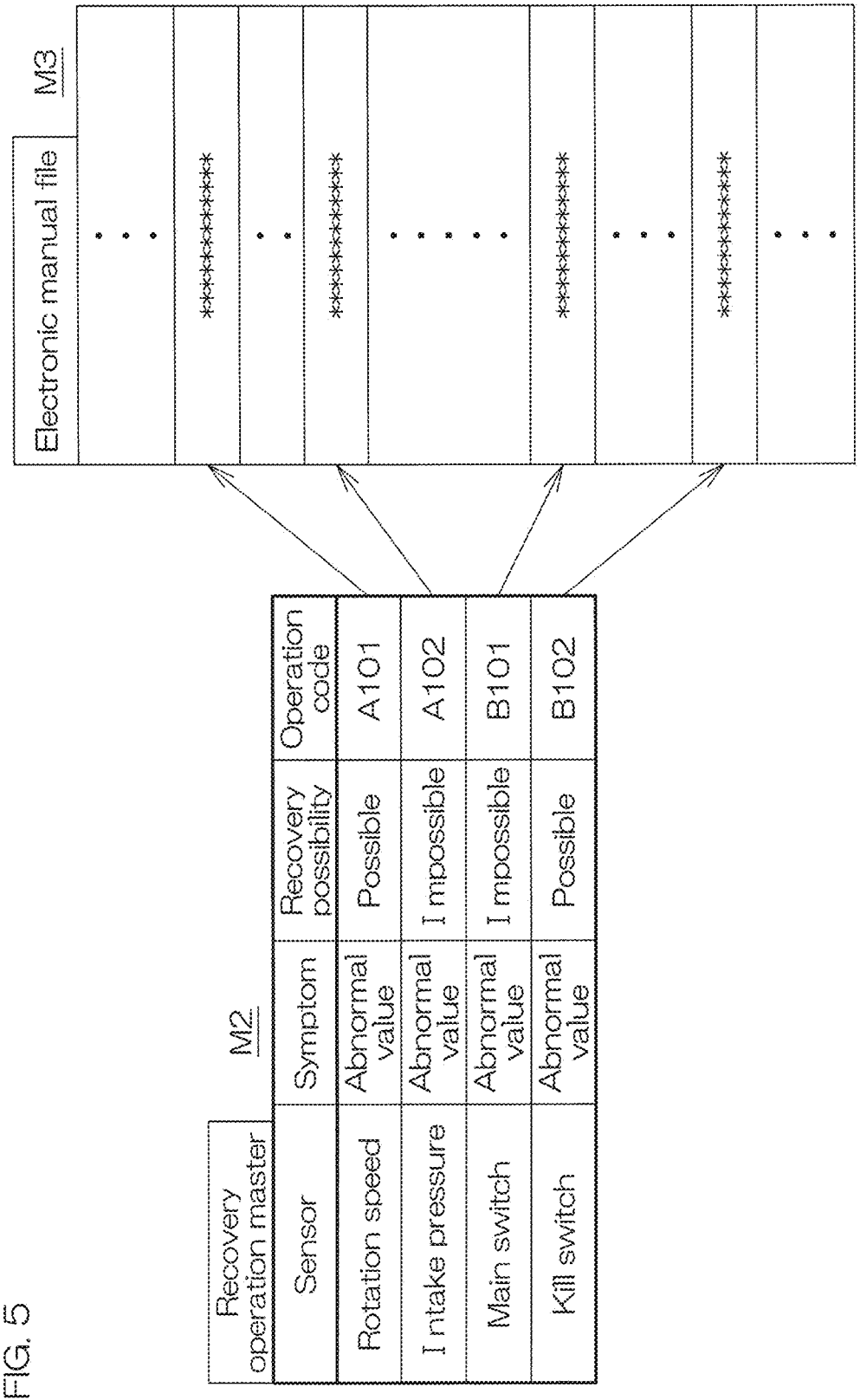
FIG. 5 shows a recovery operation master and an electronic manual file provided in the server by way of example.

FIG. 5 shows the recovery operation master M2 and the electronic manual file M3 by way of example. The recovery operation master M2 is a database defined by a table including a plurality of recovery operation records. The recovery operation records each include a sensor field, a condition field, a recovery possibility field, and an operation code field. In the recovery possibility field, a possibility determination value (possible or impossible) is described, which indicates whether or not a recovery operation by the crew is possible when a value for a sensor described in the sensor field indicates a state (abnormal value) as described in the condition field. In the operation code field, an operation code is described, which is an identifier for an operation to be performed when the value for the sensor described in the sensor field indicates the state (abnormal value) as described in the condition field. The operation code is linked to the description of the operation in the electronic manual file M3. In the electronic manual file M3, a manual is stored, which describes operations to be performed by an operator in detail. In the recovery possibility field, a predetermined value is described in terms of whether or not the crew can perform the operation corresponding to the operation code. Where the operation is to be performed by the crew on the sea, for example, the operation possibility is preliminarily determined in consideration of necessary tools, wetting during the operation and the like, and the result of the determination on the operation possibility is described in the recovery possibility field.

The abnormality determination in the server 2 is based on whether or not the values of the respective sensors are normal, or based on a relationship among a plurality of detection items and/or a plurality of input items, e.g., a combination of a plurality of sensor values or a combination of a sensor value and a condition. When the main switch 77 is operated to a start position, for example, a start switch (not shown) to supply power to the starter motors are turned on. However, if the kill switch 78 is in the ON state, the power is not supplied to the starter motors, making it impossible to start the engines 61. In this case, the ON state of the start switch and the ON state of the kill switch 78 are detected. Therefore, the server 2 determines, based on a combination (relationship) of these two sensor values (these two switch states), that the kill switch 78 has an abnormal value. A recovery operation to be performed in this case is to reconnect the kill switch 78 (to restore the kill switch 78 to the OFF state). The crew can perform this recovery operation on the watercraft by herself/himself.

An exemplary case in which the recovery operation by the crew is impossible is such that the recovery operation requires a tool or a facility that is not usually provided on the watercraft. Other exemplary cases are such that a special technical skill is required, for example, to expose some parts of the outboard motors 60 for the recovery operation and such that the recovery operation cannot be properly performed on the sea. Since a maintenance mechanic needs to perform the recovery operation on the sea or after the watercraft is towed to land, it is determined that the recovery operation by the crew is impossible.

Figure 6:
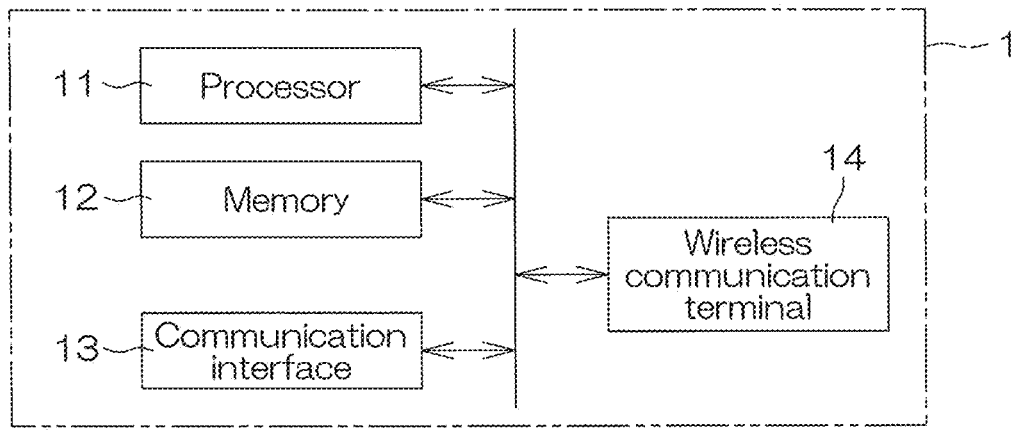
FIG. 6 is a block diagram showing a configuration of a communication terminal by way of example.

FIG. 6 is a block diagram showing the configuration of the communication terminal 1 by way of example. The communication terminal 1 includes a processor 11, a memory 12, a communication interface 13, and a wireless communication terminal 14. The processor 11 operates according to a program stored in the memory 12 to perform a plurality of functions. The communication interface 13 provides data communication via the onboard LAN 80. The wireless communication terminal 14 provides wireless transmission of data to the server 2 via the network 4.

The processor 11 performs a data collecting function to collect information from the devices provided on the hull 51 via the onboard LAN 80 and store the information in the memory 12. The information to be collected include configuration information including the names, the number, and the connection states of the devices provided in or on the hull 51. Further, the information to be collected includes the detection values of the various sensors. Specifically, the detection values of the sensors 53, 57, 64, 73 connected to the helm ECU 54, the remote control ECU 58, the steering ECUs 72, and the engine ECUs 63 can be collected. The information to be collected may further include information generated by the helm ECU 54, the remote control ECU 58, the steering ECUs 72, and the engine ECUs 63. Such information may include control information (control commands and other data) generated in the respective ECUs, and problem information detected by the respective ECUs. As described above, the main switch 77, the kill switch 78, the start switch and other switches are regarded as sensors, and the states of these switches are collected as detection values. Further, the processor 11 may have a problem detecting function to monitor the states of the various devices connected to the onboard LAN 80 and generate problem information. For example, the processor 11 may monitor the states of the respective ECUs and detect operation interruption due to an instantaneous drop of the supply voltage as a problem (instantaneous power outage). The collected information and the generated problem information and the like are stored in the memory 12. There is no need to collect the information from all the devices connected to the onboard LAN 80. For example, information from the third party's devices connected via the gateway 84 may be excluded.

The processor 11 functions to cause the wireless communication terminal 14 to transmit all or a portion of the information collected and/or generated by itself and stored in the memory 12 to the server 2. In this preferred embodiment, there are two transmission modes, i.e., a periodic transmission mode and a high-speed transmission mode.

The periodic transmission mode is a normal transmission mode in which information is transmitted to the server 2 in a periodic transmission cycle. The periodic transmission cycle may be, for example, about 10 minutes. The information to be transmitted in the periodic transmission mode may be limited to predefined periodic transmission information out of the information stored in the memory 12. Particularly important information such as the problem information is preferably included in the periodic transmission information. The periodic transmission information is uploaded and accumulated in the server 2, and is mainly used to thereafter check the occurrence of the abnormalities, the status of the watercraft during the occurrence of the abnormalities, and the like.

The high-speed transmission mode is an emergency transmission mode in which information is transmitted to the server 2 in a high-speed transmission cycle that is shorter than the periodic transmission cycle. The high-speed transmission cycle may be, for example, about 1 second. The amount of the information to be transmitted in the high-speed transmission mode is preferably greater than the amount of the information to be transmitted in the periodic transmission mode. Specifically, information useful for troubleshooting is preferably transmitted to the server 2 as much as possible in addition to the periodic transmission information. The information uploaded to the server 2 in the high-speed transmission mode is mainly used to monitor and determine the status of the watercraft 5 in real time.

Figure 7A:
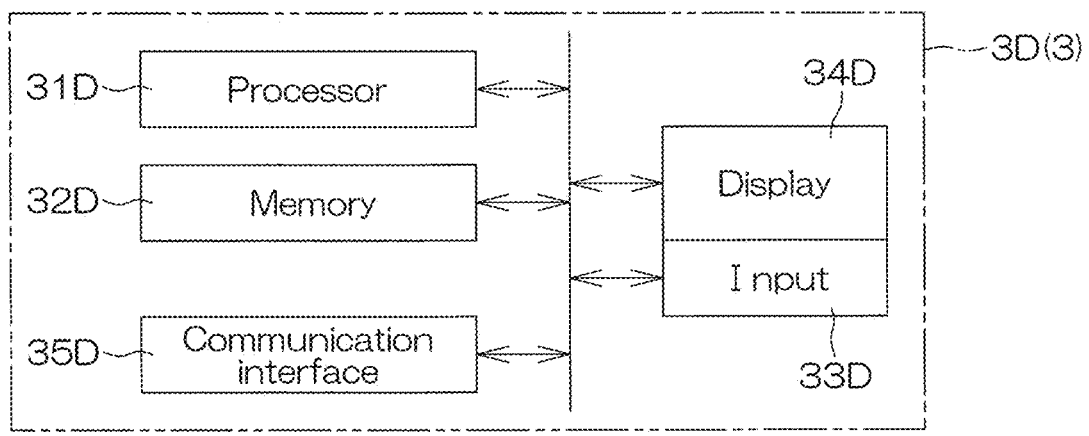
FIG. 7A is a block diagram showing a configuration of a dealer client terminal by way of example.

FIG. 7A is a block diagram showing the configuration of the dealer client terminal 3D by way of example. The dealer client terminal 3D has a basic configuration as a computer. For example, the dealer client terminal 3D may be a personal computer of the clamshell type or tablet type.

The dealer client terminal 3D includes a processor 31D, a memory 32D, an input device 33D, a display device 34D, and a communication interface 35D. The processor 31D executes a program stored in the memory 32D to perform various functions. The input device 33D may be a touch panel provided on the display screen of the display device 34D. The communication interface 35D interfaces with the network 4 for data communications. The communication interface 35D may communicate with the network 4 (see FIG. 1) via a local area network (not shown) provided in a dealer office, a marina office or the like through cable or wireless data communications. Further, the communication interface 35D may be configured to be connectable to the wireless data communication network 4B (see FIG. 1).

In the memory 32D, at least a web browser program is stored. The processor 31D executes the web browser program such that the user of the dealer client terminal 3D (the dealer staff, the marina staff or the like) can browse the web page provided by the server 2 to utilize the web application service provided on the web page.

The user of the dealer client terminal 3D can display a web page 90 (see FIG. 8) on the display device 34D. On the web page 90 thus displayed, the user can request the troubleshooting of the customer's watercraft 5, and can input a condition occurring in the customer's watercraft 5. On the displayed web page 90, the user can further acquire information about an operation required for recovery from the condition of the customer's watercraft 5, and information about whether or not the crew can perform the operation.

Figure 8:
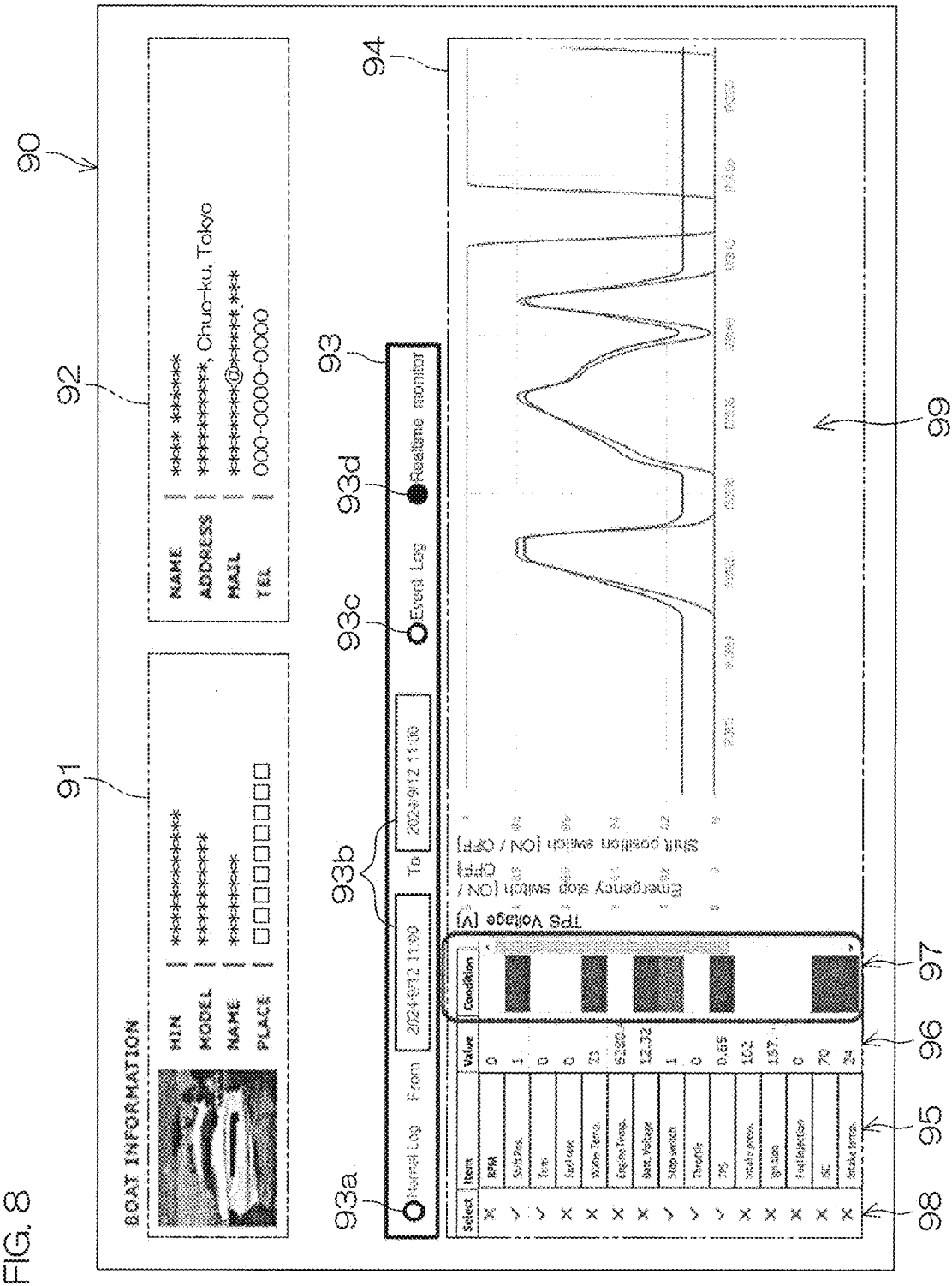
FIG. 8 shows an exemplary display screen of the client terminal.

The web page 90 shown in FIG. 8 by way of example includes a watercraft information portion 91 in which information specifying the customer's watercraft 5 is displayed, and a customer information portion 92 in which information about a customer who owns and/or uses the watercraft 5 is displayed. The web page 90 further includes a display information selection portion 93 in which information to be displayed is selected, and an information display portion 94 in which the status of the watercraft 5 is displayed.

The display information selection portion 93 includes, for example, a selection button 93a (Normal Log) to be operated to select the browsing of normal log information which is uploaded to the server 2 by the communication terminal 1 in the periodic transmission mode, and display period setting input portions 93b to be operated to set a period during which the normal log is to be displayed. The display information selection portion 93 further includes a selection button 93c (Event Log) to be operated to select the browsing of an event record such as the occurrence of the abnormality. The display information selection portion 93 further includes a selection button 93d (Realtime Monitor) to be operated to command the displaying of the information uploaded to the server 2 by the communication terminal 1 in the high-speed transmission mode. The information display portion 94 is an area in which the information selected by operating the selection buttons 93a, 93c, 93d is displayed. In FIG. 8, the real time monitor to be displayed when the selection button 93d is operated is shown by way of example.

When the selection button 93d is operated for the real time monitor, the processor 31D transmits a troubleshooting request to the server 2 in response to the operation of the selection button 93d. The troubleshooting request doubles as a high-speed transmission mode command indicating that the transmission mode of the communication terminal 1 of the watercraft 5 is to be switched to the high-speed transmission mode. Upon reception of the high-speed transmission mode command, the server 2 transmits the high-speed transmission mode command to the communication terminal 1 of the watercraft 5 and, in response thereto, the transmission mode of the communication terminal 1 is switched to the high-speed transmission mode. The information uploaded to the server 2 in the high-speed transmission mode is displayed on the information display portion 94 in the dealer client terminal 3D such that the status of the watercraft 5 is displayed in real time.

Exemplary real time display shown in FIG. 8 includes detection items 95 (sensor types or the like), numeric values 96 for the respective detection items, normal/abnormal conditions 97 for the values of the respective detection items, selection buttons 98 for selection of graphical representation items, and graphical representations 99 for selected graphical representation items. The graphical representations 99 indicate changes in the values of detection items selected by the selection buttons 98 over time. The numeric values 96, the normal/abnormal conditions 97, and the graphical representations 99 are updated every time the information from the server 2 is updated. Thus, the status of the watercraft 5 can be displayed in real time.

A maintenance mechanic or the like with a higher skill level can properly determine the status of the watercraft 5 by checking the display. Accordingly, the maintenance mechanic can speedily and properly support the crew. Further, the normal/abnormal conditions 97 each indicate a determination result obtained in the server 2. Therefore, the maintenance mechanic or the like with a higher skill level who acquires the information can preliminarily limit test items for the elimination of the problem. This also makes it possible to speedily and properly support the crew.

Figure 7B:
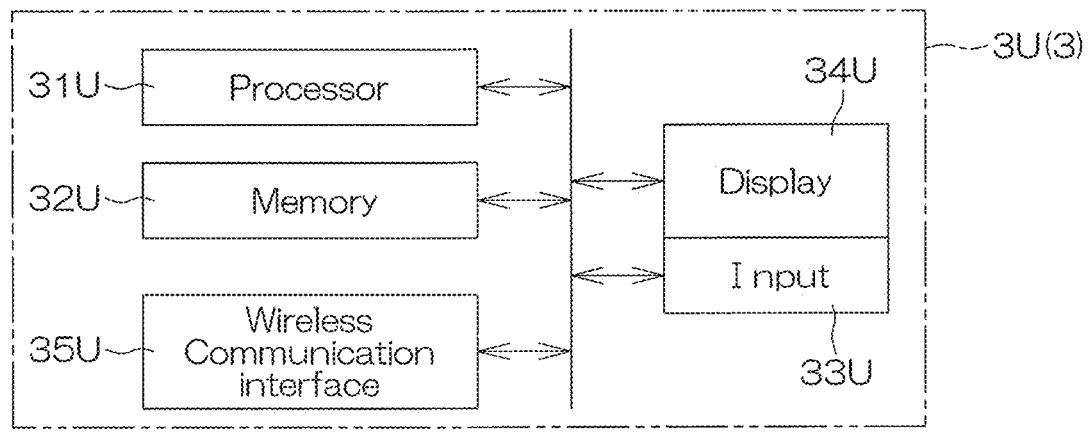
FIG. 7B is a block diagram showing a configuration of a user client terminal by way of example.

FIG. 7B is a block diagram showing the configuration of the user client terminal 3U by way of example. The user client terminal 3U has a basic configuration as a computer. Specifically, the user client terminal 3U may be a mobile terminal, more specifically, a smartphone. The user client terminal 3U includes a processor 31U, a memory 32U, an input device 33U, a display device 34U, and a wireless communication interface 35U.

The processor 31U executes a program stored in the memory 32U to perform various functions. The input device 33U may be a touch panel provided on the display screen of the display device 34U. The wireless communication interface 35U interfaces with the network 4 (more specifically, the wireless data communication network 4B) for data communications. The wireless communication interface 35U may be configured to interface with the onboard LAN 80 for data communications. In this case, the user client terminal 3U can be connected to the network 4 via the onboard LAN 80 and the communication terminal 1 for the data communications with the server 2.

In the memory 32U, an application program (so-called native application program) executable by the processor 31U is stored. The user of the user client terminal 3U (typically, the crew) can acquire the information provided by the server 2, and can display the information on the screen of the application program by causing the processor 31U to execute the application program. Further, the user of the user client terminal 3U can request the troubleshooting of the watercraft 5, and can input the condition of the watercraft 5 on the screen of the application program. On the screen of the application program, the user of the user client terminal 3U can acquire information about an operation necessary for recovery from the condition of the watercraft 5, and information about whether or not the recovery operation by the crew is possible. If the recovery operation by the crew is impossible, information indicating the need for a rescue request may be displayed instead of the information about the recovery operation.

Figure 9:
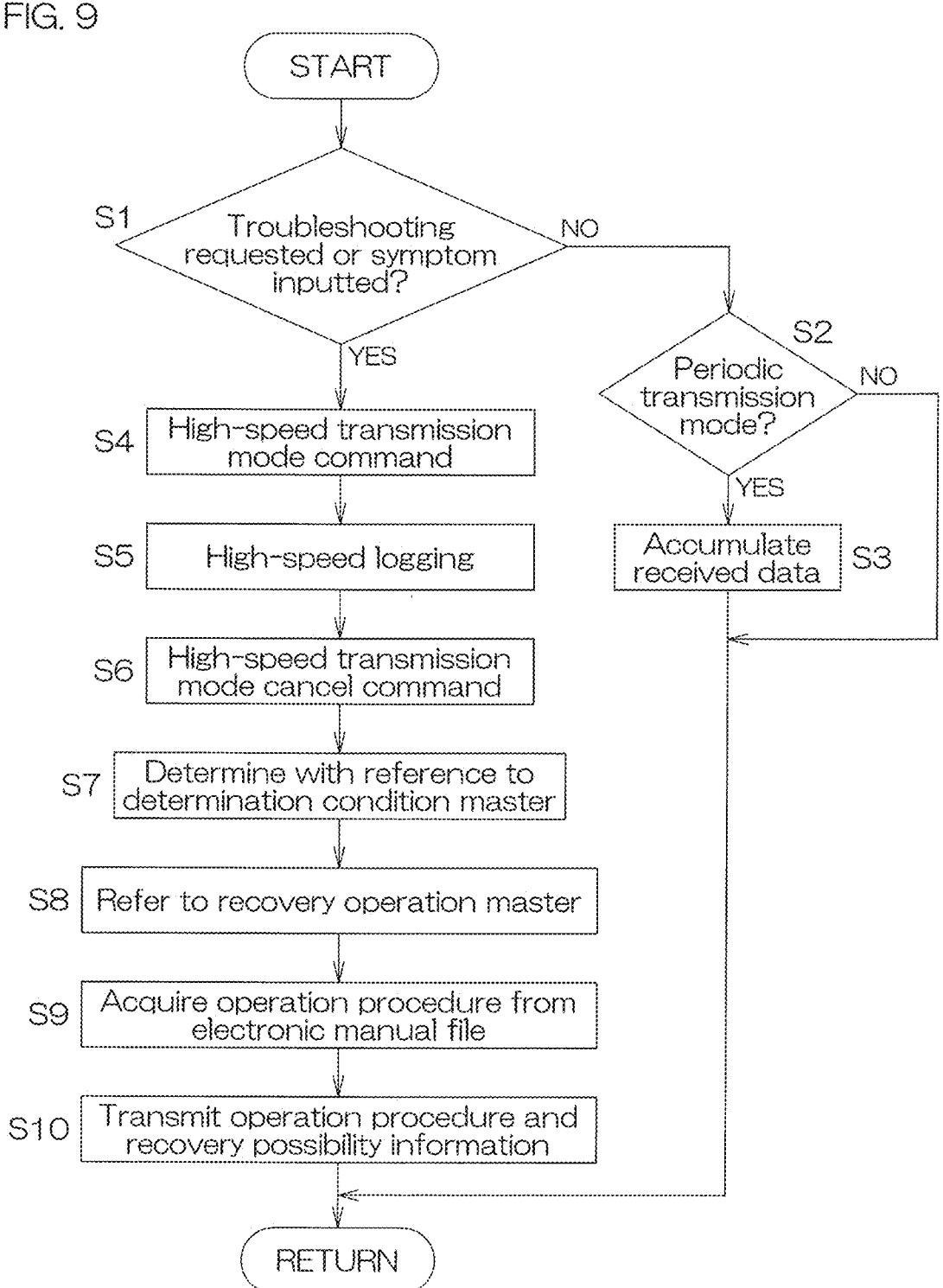
FIG. 9 is a flowchart for describing an exemplary process to be performed in the server.

FIG. 9 is a flowchart for describing an exemplary process to be performed in the server 2. In a normal state in which neither the troubleshooting request nor the condition is inputted from the client terminal 3 (NO in Step S1), the server 2 performs a normal logging operation to receive information transmitted from the communication terminal 1 in the periodic transmission cycle and accumulate the received information in the storage 23 (Steps S2 and S3).

If the troubleshooting request or the condition is inputted from the client terminal 3 (YES in Step S1), the server 2 transmits the high-speed transmission mode command to the communication terminal 1 of the watercraft 5 (Step S4). Thus, the transmission mode of the communication terminal 1 is switched to the high-speed transmission mode. The server 2 performs a high-speed logging operation to receive information transmitted from the communication terminal 1 in the high-speed transmission cycle and accumulate the information in the storage 23 (Step S5). After the server 2 receives necessary information, the server 2 may transmit a high-speed transmission mode cancel command to the communication terminal 1 (Step S6). If the communication terminal 1 receives the high-speed transmission mode cancel command, the communication terminal 1 switches its transmission mode to the periodic transmission mode.

The server 2 compares the information accumulated therein by the high-speed logging operation and the information (condition) inputted from the client terminal 3 with the determination condition master M1 to determine whether or not the status of the watercraft 5 is abnormal (specifically, whether or not abnormality occurs on the watercraft 5) (Step S7). With reference to the recovery operation master M2 based on the result of the determination, the server 2 acquires a corresponding operation code and recovery possibility information (Step S8). The server 2 acquires an article (i.e., an operation procedure) linked to the operation code from the electronic manual file M3 (Step S9). Then, the server 2 transmits the operation procedure and the recovery possibility information thus acquired to the client terminal 3 (Step S10).

Figure 10:
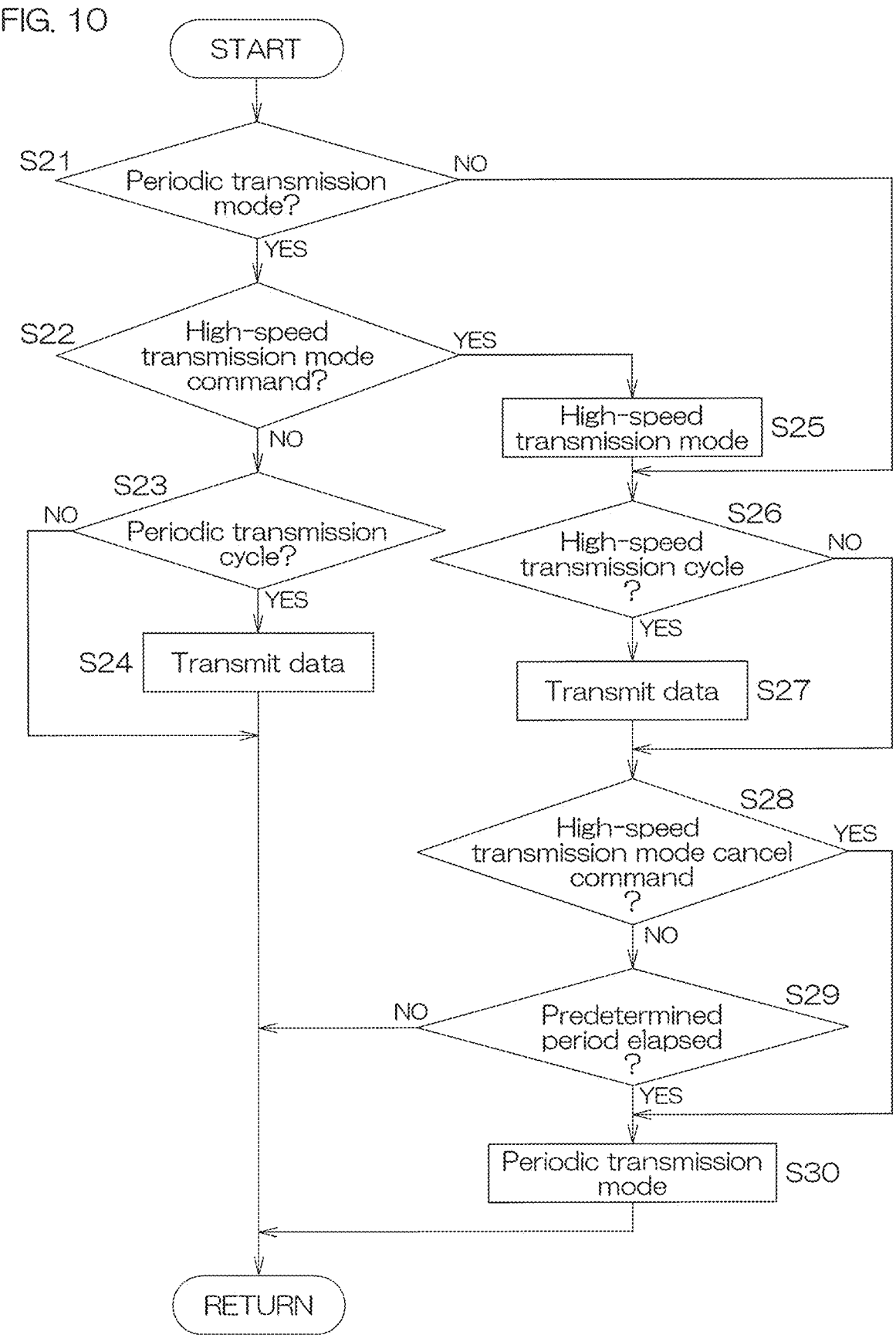
FIG. 10 is a flowchart for describing an exemplary process to be performed in the communication terminal.

FIG. 10 is a flowchart for describing an exemplary process to be performed in the communication terminal 1. The default transmission mode of the communication terminal 1 is the periodic transmission mode (YES in Step S21). In the normal state without the input of the high-speed transmission mode command (NO in Step S22), the communication terminal 1 operates in the periodic transmission mode to perform a periodic transmission operation. That is, in every periodic transmission cycle (YES in Step S23), the communication terminal 1 transmits predetermined periodic transmission information (Step S24). If the high-speed transmission mode command is inputted (YES in Step S22), the communication terminal 1 switches its transmission mode to the high-speed transmission mode (Step S25) to perform a high-speed transmission operation. That is, in every high-speed transmission cycle (YES in Step S26), the communication terminal 1 transmits predetermined high-speed transmission information (Step S27). The high-speed transmission information includes information different from the periodic transmission information. For example, the high-speed transmission information includes the periodic transmission information and other information. After a lapse of a period predetermined in consideration of time required for transmission of necessary information (YES in Step S29) or if the high-speed transmission mode cancel command is received (YES in Step S28), the communication terminal 1 cancels the high-speed transmission mode, and switches its transmission mode to the periodic transmission mode (Step S30).

The high-speed transmission mode command may be applied to the communication terminal 1 by operating the input device 83 (see FIG. 2) provided in or on the watercraft 5, rather than being transmitted from the server 2 to the communication terminal 1. In this case, the input device 83 is an example of the command device that applies the transmission mode command to the communication terminal 1. The high-speed transmission mode cancel command may also be applied in the same manner. Where the communication terminal 1 is configured to cancel the high-speed transmission mode after a lapse of the predetermined period, as described above, the high-speed transmission mode cancel command may be obviated.

Figure 11:
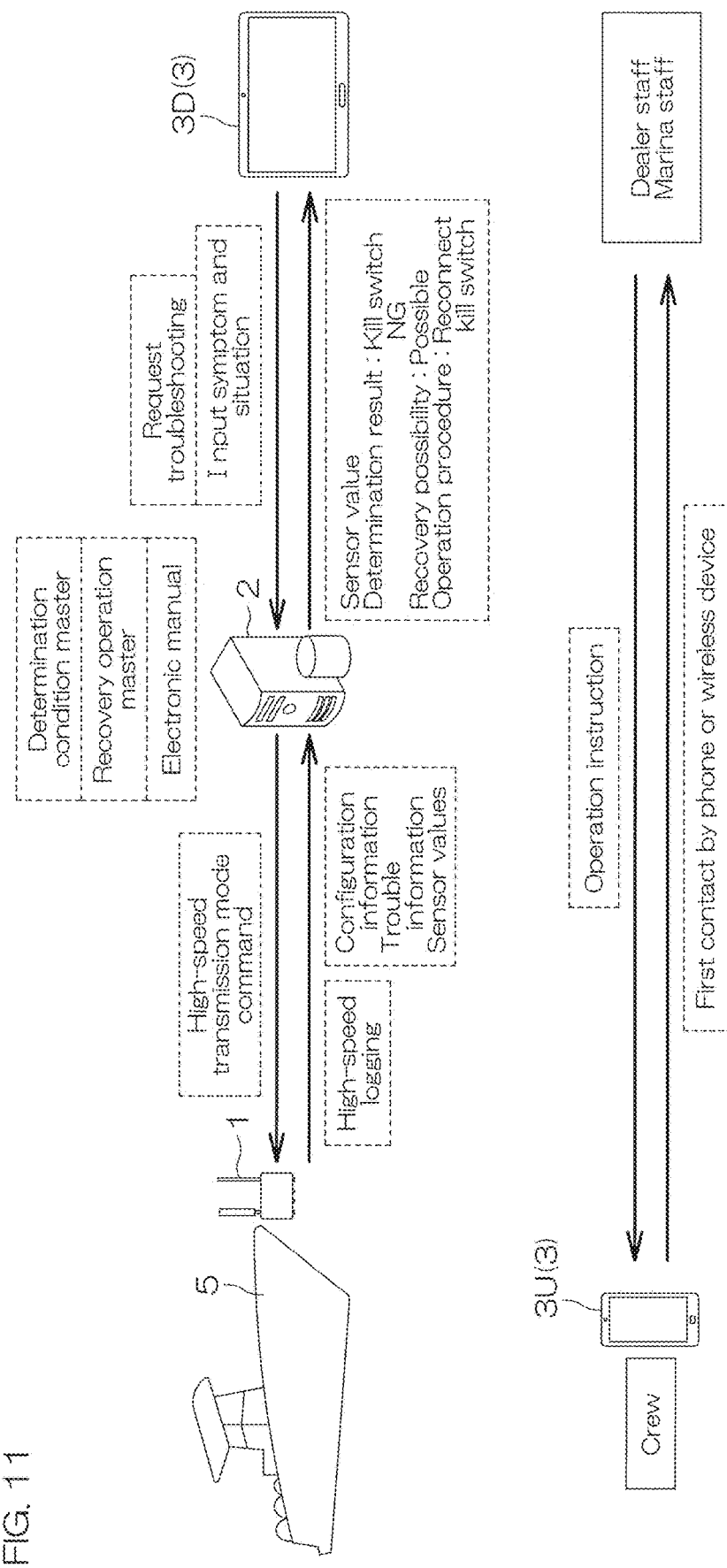
FIG. 11 shows an exemplary process flow when a problem occurs in, on or with the watercraft.

FIG. 11 shows an exemplary process flow when a problem occurs in, on, or with the watercraft 5. The crew contacts dealer staff or marina staff and describes a current status with the use of a mobile phone or a wireless communication device (e.g., a smartphone functioning as the user client terminal 3U). The contacted staff operates the dealer client terminal 3D to request the troubleshooting of the watercraft 5 on the web page provided by the server 2. As required, the staff operates the dealer client terminal 3D, and inputs the condition and the status (user's operation and the like) on the web page.

Upon reception of the troubleshooting request, the server 2 transmits the high-speed transmission mode command to the communication terminal 1 of the watercraft 5. Thus, the communication terminal 1 is switched to the high-speed transmission mode, and information (configuration information, problem information and various sensor values) required for the troubleshooting is uploaded to the server 2 at a higher rate (high-speed logging).

After the necessary information is collected, the server 2 provides operation procedure information and crew's operation possibility information to the dealer client terminal 3D on the web page with reference to the determination condition master M1, the recovery operation master M2, and the electronic manual file M3. The operation procedure information typically includes text description, and preferably includes the diagrams of major portions.

Based on the information displayed on the dealer client terminal 3D, the dealer staff or the marina staff provides information about the status to the crew. Specifically, if the operation by the crew is possible, the operation information is given to the crew to prompt the crew to perform a recovery operation. Therefore, the crew can more speedily and properly resolve the problem than by making reference to the manual. Advantageously, the crew can more easily understand the coping method than by using the manual.

If the recovery operation by the crew is impossible, the dealer staff or the marina staff informs the crew that rescue staff is to be dispatched to the watercraft 5, and prepares for rescue. The rescue staff may carry the dealer client terminal 3D when being dispatched to the watercraft 5 for rescue. In this case, as required, the rescue staff may request the server 2 to additionally perform the troubleshooting after arriving at the watercraft 5, and acquire information about the result of the troubleshooting.

As described above, the information uploaded to the server 2 in the high-speed transmission mode may be visualized and transmitted to the dealer client terminal 3D. More specifically, the server 2 may provide the information in numeric representation or in graphical representation (see FIG. 8). Detected abnormal data and sensor values are preferably highlighted. Particularly, it is preferred that data and sensor values indicating the states of the outboard motors 60 (particularly, the engines 61) as main propulsion devices and the states of associated watercraft maneuvering devices (the steering wheel 52, the remote controller 55 and the like) can be displayed in numeric representation or in graphical representation. By checking the display, the maintenance mechanic or the like with a higher skill level can properly determine the status of the watercraft 5, and can speedily and properly support the crew. Particularly, the maintenance mechanic or the like with a higher skill level can acquire the determination result obtained in the server 2 via the dealer client terminal 3D to preliminarily limit test items for the elimination of the problem. This also makes it possible to speedily and properly support the crew.

Where the crew has the user client terminal 3U, the crew may transmit a troubleshooting request to the server 2 and, as required, may input the condition and the status of the watercraft 5 before contacting the dealer staff or the marina staff. In this case, the operation procedure and information about whether or not the recovery operation by the crew is possible are provided to the user client terminal 3U from the server 2. If the recovery operation by the crew is possible, the crew performs the operation for the recovery. If the recovery by the crew is impossible, the crew contacts the dealer staff or the marina staff to request rescue.

When a problem occurs in, on, or with the watercraft 5, it is thus possible to speedily determine the status of the watercraft 5 and to properly resolve the problem. When the recovery operation by the crew is possible, the problem can be speedily eliminated. In this case, there is no need to dispatch rescue staff from the dealer or the marina, alleviating a burden on the rescue staff.

In the normal state, the communication terminal 1 can be operated in the power-saving periodic transmission mode, making it possible to reduce or minimize onboard power consumption and communication costs. When a problem occurs, on the other hand, the high-speed transmission mode is actuated and, therefore, a greater amount of information can be uploaded to the server 2 at a higher rate, making it possible to speedily make the determination in the server 2. The high-speed transmission mode is temporarily actuated when needed, and the data transmission cycle and/or the information to be transmitted are temporarily changed. Therefore, the power consumption and/or the communication costs are not excessively increased.

The server 2 speedily makes the determination based on the information uploaded from the communication terminal 1 and the information inputted from the dealer client terminal 3D or the user client terminal 3U. Particularly, it is possible to make the determination based not only on a single sensor value or a single condition but also on a combination (relationship) of a plurality of sensor values or a plurality of conditions. This makes it possible to speedily determine the status of the watercraft 5 with a skill level comparable to the high skill level of the maintenance mechanic. Thus, the crew can be speedily and properly supported.

While preferred embodiments of the present invention have thus been described, the present invention may be embodied in some other ways.

In a preferred embodiment described above, the dealer client terminal 3D is configured to use the web application provided by the server 2 on the web browser by way of example. Alternatively, like the user client terminal 3U, the dealer client terminal 3D may be configured to use the dedicated application program installed in the dealer client terminal 3D. In a preferred embodiment described above, the user client terminal 3U is configured to acquire the information from the server 2 with the use of the installed dedicated application program. Alternatively, like the dealer client terminal 3D, the user client terminal 3U may be configured to use the web application provided by the server 2 on the web browser.

In a preferred embodiment described above, the dealer staff or the marina staff responds to the contact from the crew by way of example. Alternatively, call center staff may respond to the contact from the user.

In a preferred embodiment described above, the outboard motors are used as the propulsion devices by way of example, but the propulsion devices provided on the watercraft may be inboard motors, inboard/outboard motors, jet propulsion devices and other types of propulsion devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A crew support system comprising:
a communication device configured or programmed to collect information about a device provided on a watercraft and transmit the information;
a server configured or programmed to receive the information from the communication device and accumulate the information therein; and
a client terminal configured or programmed to communicate with the server to receive the information from the server; wherein
the communication device includes a periodic transmission mode in which the information is transmitted to the server in a periodic transmission cycle, and a high-speed transmission mode in which the information is transmitted to the server in a cycle shorter than the periodic transmission cycle;
when a problem occurs on the watercraft, the server is configured or programmed to determine a status of the watercraft based on the information transmitted thereto from the communication device in the high-speed transmission mode, and transmit information about measures to address the problem to the client terminal;
the client terminal is configured or programmed to provide the information received from the server to a user;
the server includes a web application program to be operated by a web browser of the client terminal, and is configured or programmed to accept an input from the client terminal and provide the information to the client terminal via the web application program; and
the input from the client terminal includes a selection button to transmit a troubleshooting request to the server which doubles as a high-speed transmission mode command.

2. The crew support system according to claim 1, wherein the server is configured or programmed to determine, based on the result of the determination on the status of the watercraft, whether or not a recovery operation by the crew is possible, and transmit information about a result of the determination on the recovery operation to the client terminal.

3. The crew support system according to claim 1, wherein the server is configured or programmed to determine the status of the watercraft based on a combination of a plurality of information items received from the communication device.

4. The crew support system according to claim 1, wherein the communication device is configured or programmed to be switched from the periodic transmission mode to the high-speed transmission mode in response to a command from the server.

5. The crew support system according to claim 1, wherein the communication device is configured or programmed to be switched from the periodic transmission mode to the high-speed transmission mode in response to a command from a command device provided on the watercraft.

6. The crew support system according to claim 1, wherein the client terminal includes an application program accessible to the server, and is configured or programmed to transmit and receive the information to/from the server by a function of the application program.

7. The server for use in the crew support system according to claim 1.

8. The communication device for use in the crew support system according to claim 1.

9. The client terminal for use in the crew support system according to claim 1.

10. The crew support system according to claim 1, wherein the information transmitted from the communication device in the high-speed transmission includes information for troubleshooting the problem occurring on the watercraft.

11. The crew support system according to claim 1, wherein the client terminal includes a display, and the information transmitted to the server in the high-speed transmission mode is displayed on the display in real time.

* * * * *